United States Patent [19]

Pessel

[11] 4,284,608

[45] * Aug. 18, 1981

[54] PROCESS FOR REGENERATING SULFUR DIOXIDE GAS SCRUBBING SOLUTIONS

[75] Inventor: Leopold Pessel, Wyndmoor, Pa.

[73] Assignee: American Electronic Laboratories, Inc., Lansdale, Pa.

[ * ] Notice: The portion of the term of this patent subsequent to Jan. 24, 1995, has been disclaimed.

[21] Appl. No.: 973,255

[22] Filed: Dec. 26, 1978

Related U.S. Application Data

[60] Continuation-in-part of Ser. No. 816,293, Jul. 18, 1977, Pat. No. 4,157,988, which is a division of Ser. No. 678,291, Apr. 19, 1976, Pat. No. 4,091,075, which is a continuation-in-part of Ser. No. 545,928, Jan. 31, 1975, Pat. No. 4,070,441.

[51] Int. Cl.$^3$ ............................................. C01B 17/00
[52] U.S. Cl. .................................... 423/242; 423/558
[58] Field of Search ............... 423/242 A, 242 R, 558; 204/180 P

[56] References Cited

U.S. PATENT DOCUMENTS

| | | | |
|---|---|---|---|
| 2,188,324 | 1/1940 | Walthall | 423/242 R |
| 3,836,630 | 9/1974 | Noguchi et al. | 423/242 A |
| 3,943,228 | 3/1976 | Dezael et al. | 423/242 A |
| 4,091,075 | 5/1978 | Pessel | 423/242 |
| 4,113,588 | 9/1978 | Watanabe et al. | 204/180 P |

OTHER PUBLICATIONS

Mellor, Comprehensive Treatise on Inorganic and Theoretical Chemistry, 1935, pp. 262, 266, 303, 304 and 315.

*Primary Examiner*—O. R. Vertiz
*Assistant Examiner*—Gregory A. Heller
*Attorney, Agent, or Firm*—Seidel, Gonda, Goldhammer & Panitch

[57] ABSTRACT

It is known to remove sulfur dioxide from gas streams, particularly waste or flue gases, by contact with aqueous scrubbing solutions containing a metal salt, such as ferric sulfate, in which the valence of the metal is reduced by the sulfur dioxide. It is also known that such scrubbing solutions can be regenerated by oxidizing the reduced metal salt, such as ferrous sulfate, back to the higher valence for further use in removing sulfur dioxide. According to the invention, the regeneration of the scrubbing solution is advantageously effected by electrolytic or anodic oxidation, rather than air oxidation, of the reduced metal salt, since anodic oxidation is not adversely affected by the increase in sulfuric acid content of the scrubbing solution which results from the conversion of the sulfur dioxide absorbed in the scrubbing solution.

6 Claims, 1 Drawing Figure

U.S. Patent
Aug. 18, 1981
4,284,608
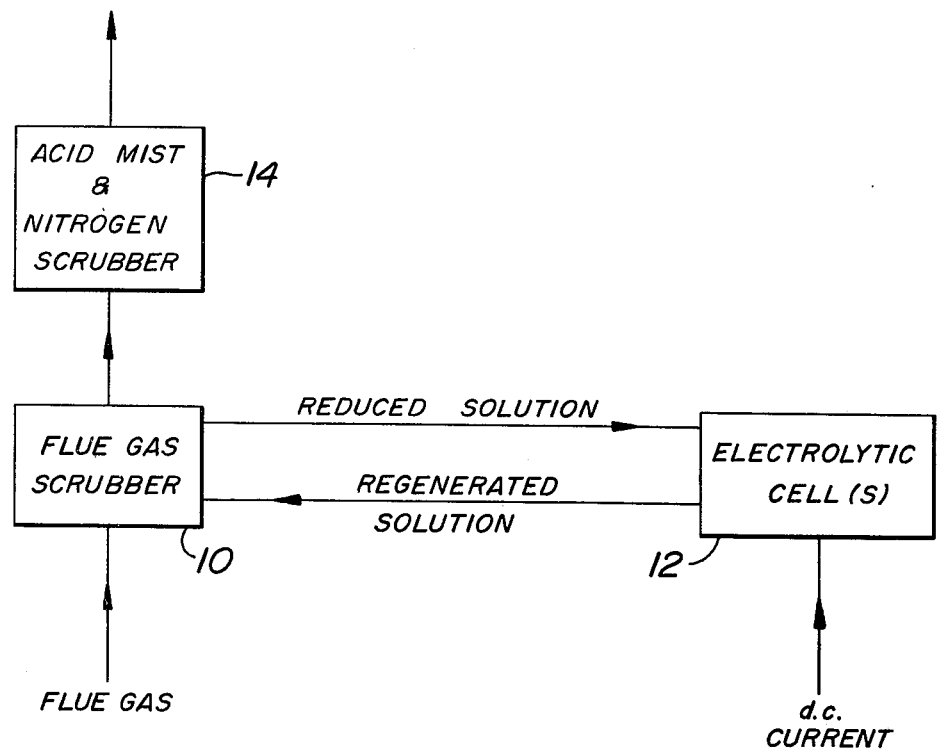

PROCESS FOR REGENERATING SULFUR DIOXIDE GAS SCRUBBING SOLUTIONS

CROSS REFERENCE TO RELATED APPLICATIONS

This application is a continuation in part of my copending application Ser. No. 816,293, filed July 18, 1977, now U.S. Pat. No. 4,157,988, which was a division of Ser. No. 678,291, filed Apr. 19, 1976, now U.S. Pat. No. 4,091,075, which was a continuation-in-part of Ser. No. 545,928, filed Jan. 31, 1975, now U.S. Pat. No. 4,070,441.

BACKGROUND OF THE INVENTION

The present invention is directed to a method for regenerating sulfur dioxide gas scrubbing solutions. More particularly, the invention is directed to an improvement in the method of reoxidizing metal salts which have been reduced by sulfur dioxide absorbed in the scrubbing solutions, whereby the solutions may be recycled and reused for further sulfur dioxide removal.

A method for removing sulfur dioxide from gas streams, such as flue gases, by scrubbing with an aqueous solution of a reducible metal salt, such as ferric sulfate, has previously been described and claimed in my U.S. Pat. No. 4,070,441 issued Jan. 24, 1978. The disclosure of that patent is incorporated herein by reference.

An essential feature of the method covered by U.S. Pat. No. 4,070,441 is the regeneration or reoxidation of the reduced metal salt formed from the chemical reaction with sulfur dioxide. The regeneration makes it possible to use an initial charge of the metal salt for a long period of time by repeated recycling, without the need of discarding any spent charges and replacing with fresh ones. The regeneration of the metal salt in Flue Gas Desulfurization (F.G.D.) processes has great economic and environmental advantages over other F.G.D. methods, especially those using lime and similar materials which require dumping of the spent scrubbing material and replacement with fresh material.

According to U.S. Pat. No. 4,070,441, the regeneration of the scrubbing solution is accomplished by alternating the flue gas scrubbing with intervals of scrubbing the solution with air or other oxygen-containing gas, whereby the oxygen reoxidizes the reduced metal salt to its original high valence state. As these scrubbing cycles with flue gas and air are repeated many times, there is an increase in the sulfuric acid content of the scrubbing solution due to the oxidation and conversion of sulfur dioxide to sulfuric acid which becomes dissolved in the scrubbing solution.

It has been recognized that the rate of reoxidation of the reduced metal salt, such as ferrous sulfate, by air is impeded or slowed considerably as the sulfuric acid concentration of the solution increases. As a result, sulfuric acid build up presents a very serious obstacle to F.G.D. processes using metal salts such as ferric sulfate, and various means of accelerating the rate of regeneration have been proposed.

In my U.S. Pat. No. 4,091,075, issued May 23, 1978, it is proposed to use aluminum ions to accelerate the rate of regeneration or reoxidation of the reduced metal salt with air. The disclosure of that patent is incorporated herein by reference. Nevertheless, the depressing effect of increasing sulfuric acid content upon the rate of regeneration of the reduced metal salt by air still remains a serious factor, and more efficient methods of regeneration are being sought.

A number of other means of accelerating the rate of regeneration have been tried or proposed, including thermal acceleration, chemical accelerators and increase of oxygen in closed systems. Chemical accelerators, aside from their added expense, also have the disadvantage that their residues remaining in the solution will affect the potential subsequent industrial utilization of the sulfuric acid building up in the solution. Direct oxidizing agents such as hydrogen peroxide, ozone, etc., are volatile and can be expelled by heating the fluid. However, they are expensive and add complications to the process, as in the case with the other above described accelerating means, as well as raising some potentially serious environmental problems.

SUMMARY OF THE INVENTION

The above and other problems of the prior art are alleviated by the present invention wherein the regeneration of sulfur dioxide scrubbing solutions containing a reduceable metal salt is accomplished by reoxidizing the reduced metal salt in the solution by anodic (electrolytic) oxidation. Thus, it has been found that anodic oxidation of metal salts such as the oxidation of ferrous sulfate to ferric sulfate, is not adversely affected by increasing the sulfuric acid content of solutions containing the metal salt.

Advantageously, the regeneration by anodic oxidation may be carried out either intermittently or continuously, and without the necessity of shifting the scrubbing solution from contact with flue gas to contact with air. However, if desired, the process of the present invention may be combined with the process of U.S. Pat. No. 4,070,441, and optionally the process of U.S. Pat. No. 4,091,075, so that a portion of the scrubbing solution is regenerated by contact with air or other oxygen containing gas, and a portion of the scrubbing solution is regenerated by anodic oxidation.

BRIEF DESCRIPTION OF THE DRAWING

For the purpose of illustrating the invention, there is shown in the drawing a form which is presently preferred; it being understood, however, that this invention is not limited to the precise arrangements and instrumentalities shown.

The single FIGURE of drawing is a simplified flow chart illustrating the method according to the present invention.

DETAILED DESCRIPTION OF THE PREFERRED EMBODIMENT

As shown in the drawing, the sulfur dioxide containing gas stream, such as the flue gas from an industrial coal-burning facility, is passed into a flue gas scrubber 10 which contains an aqueous solution of a metal salt which is capable of being reduced from a high valence state to a lower valence state. The metal salt may be any water soluble salt of a polyvalent metal which is capable of being reduced by sulfur dioxide and capable of being reoxidized by electrolytic or anodic oxidation. Suitable commercially available salts include the salts of such metals as iron, manganese, vanadium, etc., but the salts of iron (ferric salts) are preferred for economic reasons. Similarly, any suitable anion may be used which will render the metal salt water soluble, but the sulfates are preferred due to their compatability with sulfuric acid formed by absorption of sulfur dioxide.

For ease of discussion, the process of the present invention will be described hereinafter with specific reference to the use of ferric sulfate as the metal salt in the aqueous scrubbing solution. However, it should be understood that other metal salts such as those indicated above and others can be employed in the process of the present invention in essentially the same manner. The scrubbing solution containing metal salt is preferably slightly acidic, such as by the addition of sulfuric acid, and typical reactions of the scrubbing solution with the sulfur dioxide are set forth in column 2 of U.S. Pat. No. 4,070,441.

When the scrubbing solution in the flue gas scrubber reaches a predetermined concentration of ferrous sulfate, the scrubbing solution is removed from the scrubber 10 and transferred to an electrolytic cell or cells 12 for reoxidation of the ferrous sulfate to ferric sulfate. The stage at which the scrubbing solution is transferred to the electrolytic cells is variable and will depend upon a number of practical considerations, such as those described at columns 3 and 4 of U.S. Pat. No. 4,070,441. Alternatively, if continuous or intermittent regeneration of the scrubbing solution are desired, a portion of the scrubbing solution may be continuously or periodically removed from the flue gas scrubber to the electrolytic cells and then immediately recycled to the flue gas scrubber after reoxidation of the ferrous sulfate to ferric sulfate. If possible, it would be most desirable to incorporate the electrolytic cell into the scrubber 10, so that the solution could be continuously regenerated without the need of transferring the solution, or portions thereof, to a separate cell. So far as is presently known, these considerations are not critical to the concept of the present invention and therefore will not be described in further detail except by reference to U.S. Pat. Nos. 4,070,441 and 4,091,075.

Anodic or electrolytic oxidation (which terms will be used interchangeably herein to denote oxidation in an electrolytic cell) of ferrous sulfate to ferric sulfate, per se, has been known for many years. References to such oxidation may be found, for example, in J. W. Mellor, *Comprehensive Treatise On Inorganic And Theoretical Chemistry*, Longman, Green & Co., London-New York-Toronto (1935), Volume 14, pp. 262, 266, 303, 304 and 315. The mechanisms, details and apparatus of anodic or electrolytic oxidation are well known to chemists of ordinary skill, and need not be explained here in detail except by suggesting some possible variations which may be used.

For example, in the electrolytic oxidation of ferrous sulfate, electrolysis can be carried out in at least two stages. In the first stage, the product formed at the cathode of the cell would be hydrogen, which could be used as such, if locally usable, or returned to a boiler as fuel. In the second stage, the product formed at the cathode would be electrolytic iron, for which many applications are available. At the anode, oxidation would take place in several stages including evolution of oxygen, formation of persulfuric acid, and oxidation of ferrous to ferric ions.

A number of suitable electrolytic cells are commercially available and known in the art for carrying out electrolytic oxidation. Particularly preferred are the so-called divided or diaphragm cells in which the anolyte and catolyte are separated. The anodic oxidation may be carried out by passing the scrubbing solution, which ay contain varying amounts of ferric sulfate, ferrous sulfate, sulfuric acid and other gaseous or solid components derived from the flue gas which has been scrubbed, through single or multiple electrolytic cells. The regenerated anolytes may be returned directly to the reservoir of scrubber 10 while the anolyte chambers of the cells are refilled with un-regenerated catolyte. Alternatively, the regenerated anolytes may be stored in bulk before returning them to scrubber 10. Thus, it will be apparent that the electrolytic cells may be adapted for batch, intermittent or continuous regeneration and recycling.

Further, since the regeneration of ferric sulfate solution by anodic oxidation will be an integral part of the F.G.D. process, it is contemplated that any or all variables of the anodic oxidation process, such as voltage, current, time, cell design or utilization, flow and storage of liquids, etc. may be controlled by monitoring a variety of factors in the overall F.G.D. process. Such factors may include ferrous sulfate or sulfuric acid content of the solution, sulfur dioxide content of the flue gas, effectiveness of any other regeneration methods used simultaneously, or other factors of the process.

In the latter regard, it will be understood that regeneration by anodic oxidation according to the present invention may be the sole means of regeneration or may be used in connection with other regeneration means such as scrubbing with air, with the various regeneration methods being used either in tandem or separately on different portions of the recycled solution.

If desired, the F.G.D. process may include an additional scrubber 14 following the flue gas scrubber 10 which contains ferric sulfate solution. Scrubber 14 may advantageously contain an aqueous solution of a basic nitrogen compound such as urea or guanidine, for the purpose of trapping and absorbing acid mist and nitrogen containing combustion gas products which may be carried over by the gas stream exiting from scrubber 10. The operation and advantages of such a scrubber 14 are described in more detail in column 4 of U.S. Pat. No. 4,070,441.

The feasibility of regeneration of ferric sulfate scrubbing solutions by anodic oxidation according to the present invention is demonstrated by the following specific, non-limiting examples. It will be understood that a wide variety of currents, voltages and cell designs may be selected for use in carrying out the present invention, and those used in the following examples are for illustration only and are not intended to limit the choices of apparatus or procedure.

EXAMPLE I

A series of solutions of ferrous sulfate containing different concentrations of sulfuric acid were prepared and subjected to anodic oxidation. In a first series of tests, five 20 ml samples containing 2 grams each of ferrous sulfate heptahydrate ($FeSO_4$-$7H_2O$) reagent were prepared and concentrated sulfuric acid (specific gravity equal 1.84) was added to each in sufficient amount to yield nominal volume concentrations of 5, 10, 20, 50 and 66% $H_2SO_4$, respectively.

The tests were carried out in a divided cell using a type 304 stainless steel strip as the cathode and a carbon rod as the anode with a bridge of electrolyte to convey the current between catolyte and anolyte. Electrolysis was carried out with a dc power supply set at 30 volts with a current between 0.1 and 0.3 amperes. After 5 minutes of electrolysis for each sample, the current was interrupted and a sample of the anolyte was withdrawn and the ferric ion content was qualitatively estimated in comparison to the catolyte by testing with the well known ammonium thiocyanate reagent.

In each case, there was distinct oxidation (formation of ferric ions) of the anolyte, as indicated by both the ammonium thiocyanate test and the visible change of color of the anolyte toward a yellowish shade. At the highest acid concentration (approximately 66%), there was a permanent whitish turbidity of the solution, indicating the precipitation of a solid phase from the iron solution.

EXAMPLE II

Similar tests to Example I were carried out with a series of solutions containing 20, 30 and 40 grams, respectively, of ferrous sulfate heptahydrate per 100 ml of water and various concentrations of sulfuric acid. These samples were heated to improve solubility. In addition, some of the solutions, instead of being prepared from ferrous sulfate reagent, were prepared by reaction of ferric sulfate solution with sulfur dioxide, and contained various proportions of unreacted ferric sulfate. As with the Example I, anodic oxidation of each sample showed an increase in the ferric ion content.

EXAMPLE III

To a solution containing 10 grams of ferrous sulfate heptahydrate and sufficient distilled water to yield a total volume of 100 ml was added 10 ml of concentrated sulfuric acid. 5 ml of the above solution was placed in each of 2 small casseroles, to each of which was added 5 ml of concentrated sulfuric acid, giving a nominal sulfuric acid content of 50 volume percent.

The 2 above casseroles were connected by a salt bridge consisting of an inverted glass U-tube filled with the initially prepared acidified ferrous sulfate solution. A stainless steel cathode was placed in one casserole, a carbon rod anode immersed in the other to form an electrolytic cell. Using a 30 volt power supply, dc current at 0.1 ampere was passed through the electrolytic cell.

The anolyte around the carbon anode assumed a brownish or yellowish color in comparison with the catolyte around the stainless steel cathode, indicating anodic oxidation of the ferrous sulfate in the anolyte. Testing with ammonium thiocyanate solution, a sample of the anolyte showed an intensive ferric ion color as compared with a very faint rose color of the catolyte.

The above examples indicate that regeneration of ferrous sulfate to ferric sulfate by anodic oxidation seems to proceed independently of the sulfuric acid content of the solution up to the highest acid concentrations tested. Hence, the present invention provides considerable advantages over the prior art oxidation with air which is impeded by acid concentration and pH limitations. Since the anodic oxidation of ferrous sulfate is not limited or impeded by increasing acidity of the electrolyte, the solution can be allowed to increase in sulfuric acid concentration to levels consistent with efficient operation of the flue gas scrubber for economic recovery of sulfuric acid as an ultimate by-product.

In addition to allowing regeneration of ferrous sulfate to ferric sulfate over a wide range of acid concentrations, the electric energy requirements for operating electrolytic cells used in anodic operation may be considerably less than the power requirements for pumps, blowers and related equipment needed for oxidation by air scrubbing. Still further advantages of the present method include the smaller space requirements of electrolytic cells and their accessories as compared to the requirements for blowers, scrubbing chambers and related equipment for air oxidation. These advantages make the present process particularly attractive for small boiler installations. Also, as previously alluded to, the present process allows automation of the regeneration procedure based upon ferrous sulfate content of the solution, sulfur dioxide content of the flue gas and other process variables.

The present invention may be embodied in other specific forms without departing from the spirit or essential attributes thereof and, accordingly, reference should be made to the appended claims, rather than to the foregoing specification, as indicating the scope of the invention.

I claim:

1. In a one-step process of removing sulfur dioxide from a gas stream by contact with an aqueous scrubbing solution of a metal salt providing ferric ions, the metal salt being reacted stoichiometrically with sulfur dioxide to reduce the ferric ions of the metal salt to ferrous ions, with the concurrent formation of sulfuric acid which dissolves in the solution, and including as a second step the regeneration of the solution by oxidation of the ferrous ions of the reduced metal salt to ferric ions, thus permitting continuous or repeated use of the solution, the improvement comprising effecting the regeneration of the solution by anodic oxidation of the ferrous ions of the reduced metal salt.

2. A process according to claim 1 wherein said metal salt is ferric sulfate and said reduced metal salt is ferrous sulfate.

3. A process according to claim 1 wherein the regeneration is effected continuously.

4. A process according to claim 1 wherein a portion of the aqueous solution is regenerated by oxidation by contacting with an oxygen-containing gas.

5. A process according to claim 4 wherein the regeneration of said portion is catalyzed by the presence of aluminum ions.

6. A process according to claim 1 wherein the metal salt is present in the solution in an initial amount of one percent by weight up to the saturation limit of the salt in solution.

* * * * *